United States Patent [19]

Kramb

[11] 4,089,851
[45] May 16, 1978

[54] SULFO CONTAINING DISAZO DYESTUFFS DERIVED FROM DIAZOTIZED 4,4'-DIAMINOBENZANILIDE, A 1-PHENYL-3-METHYL-5-AMINOPYRAZOLE COUPLER AND A SECOND COUPLER

[75] Inventor: Hans Kramb, de Barcelona, Spain

[73] Assignee: Bayer Aktiengesellschaft, Leverkusen, Germany

[21] Appl. No.: 696,299

[22] Filed: Jun. 15, 1976

[30] Foreign Application Priority Data

Jun. 19, 1975 Germany .................. 2527395

[51] Int. Cl.² .................. C09B 31/28; D06P 1/39; D06P 3/24; D21H 1/46
[52] U.S. Cl. .................. 260/160; 260/162
[58] Field of Search .................. 260/160

[56] References Cited

U.S. PATENT DOCUMENTS

| 2,127,986 | 8/1938 | Roos | 260/160 |
| 2,228,288 | 1/1941 | Suckfull et al. | 260/160 X |
| 2,544,087 | 3/1951 | Hindermann | 260/160 |
| 2,727,886 | 12/1955 | Grandjean | 260/160 |

FOREIGN PATENT DOCUMENTS

| 612,174 | 11/1948 | United Kingdom | 260/160 |

Primary Examiner—Floyd D. Higel
Attorney, Agent, or Firm—Plumley & Tyner

[57] ABSTRACT

Disazo dyestuffs of the formula

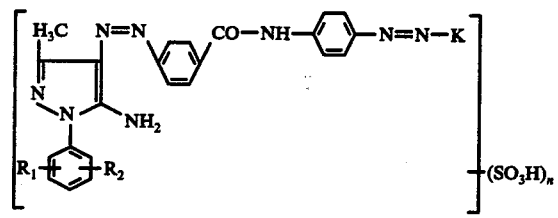

in which

K represents the radical of a coupling component of the benzene, acetoacetic acid arylide, pyrazolone or aminopyrazole series, $R_1$ and $R_2$ denote hydrogen, $C_1$-$C_4$-alkyl, $C_1$-$C_4$-alkoxy or halogen and n denotes 1 or 2, are suitable for the dyeing of natural and synthetic fibre materials and paper in greenish to reddish yellow shades. The dyeings particularly on polyamide have good to very good light fastness and good fastness to water and washing.

1 Claim, No Drawings

SULFO CONTAINING DISAZO DYESTUFFS DERIVED FROM DIAZOTIZED 4,4'-DIAMINOBENZANILIDE, A 1-PHENYL-3-METHYL-5-AMINOPYRAZOLE COUPLER AND A SECOND COUPLER

The invention relates to disazo dyestuffs which in the form of the free acid correspond to the formula

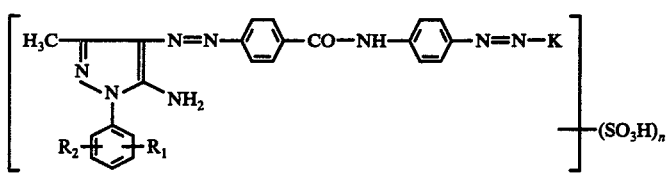

I in which

K represents the radical of a coupling component of the benzene, acetoacetic acid arylide, pyrazolone or aminopyrazole series, $R_1$ and $R_2$ denote hydrogen, $C_1$–$C_4$-alkyl, $C_1$–$C_4$-alkoxy or halogen and n denotes 1 or 2.

Examples of suitable coupling components of the benzene series are phenols of the formula

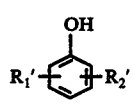

wherein $R_1'$ and $R_2'$ denote hydrogen, $C_1$–$C_4$-alkoxy, $C_1$–$C_4$-alkyl, halogen or sulpho.

Suitable acetoacetic acid arylides correspond, for example, to the formula

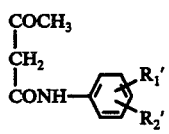

wherein $R_1'$ and $R_2'$ have the abovementioned meaning.

Examples of pyrazolones and aminopyrazoles which should be mentioned are those of the (tautomeric) formula

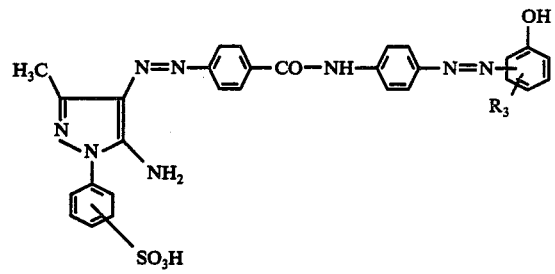

wherein

X denotes $NH_2$ or OH and $R_1'$ and $R_2'$ have the abovementioned meaning.

Preferred dyestuffs correspond, in the form of the free acid, to the formula

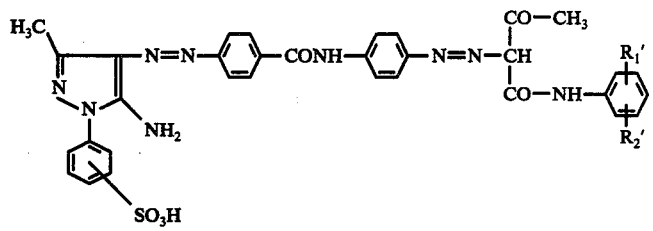

wherein $R_3$ denotes hydrogen, $C_1$–$C_4$-alkyl or halogen and the OH groups in the o- or p-position to the azo group, and to the formula

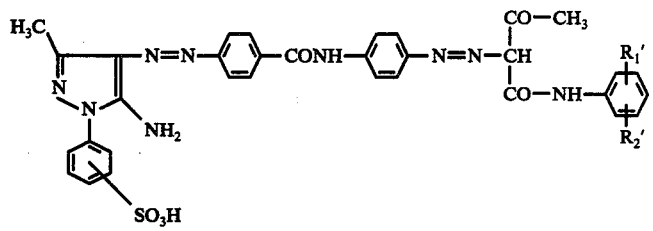

wherein $R_1'$ and $R_2'$ have the abovementioned meaning.

The dyestuffs of the formula I are prepared by coupling diazotised amines of the formula

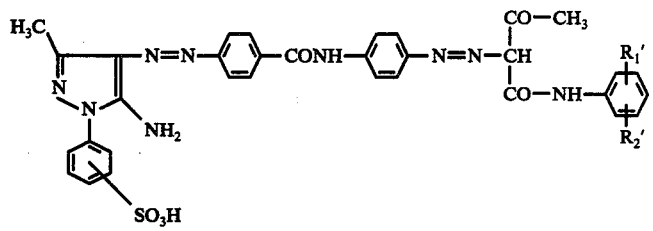

wherein $R_1$ and $R_2$ have the abovementioned meaning and m represents 0, 1 or 2 with 1 mol of a coupling component H—K wherein K has the abovementioned meaning, in an alkaline or, optionally, a weakly acid medium, the starting compounds being so chosen that the end product contains 1 or 2 sulphonic acid groups. The dyestuffs of the formula 1 are suitable for dyeing natural and synthetic fibre materials and paper. They are particularly suitable for dyeing and printing polyamides, such as poly-ε-caprolactam or condensation products of adipic acid and hexamethylenediamine. Clear, greenish-tinged to reddish-tinged yellow dyeings having good to very good light fastness and good fastness to water and washing are obtained on polyamide. Dyestuffs of the formula I which contain only one sulphonic acid group in the molecule are preferred for dyeing of polyamide. These dyestuffs are distinguished by good covering of structural differences attributable to the material. The dyestuffs can be employed in the form of the free acid or of its salts, especially the alkali salts, preferably the sodium or lithium salts, or the ammonium salts.

EXAMPLE 1

11.35 g of 4,4'-diaminobenzanilide are stirred with about 300 ml of water and tetrazotised, at 0°–5° C, with 28.5 ml of hydrochloric acid of 19° Be strength and 7 g of sodium nitrite. Before coupling, the excess nitrite is destroyed with aminosulphonic acid and the tetrazotised mixture is brought to pH 2.5 with about 25 ml of 20% strength sodium carbonate solution. A wealy acid (pH 4.5) aqueous solution of 13.3 g of 1-(m-sulphophenyl)-3-methyl-5-aminopyrazole is then added over the course of 20 minutes. 50 ml of 20% strength sodium acetate solution are then added, whereupon the pH assumes a value of 4.5.

After about 1 hour, the one-sided coupling reaction is complete. The resulting mixture is added to a mixture of 5 g of phenol, 130 ml of water, 4.5 ml of sodium hydroxide solution of 40° Be strength and 17.5 g of sodium carbonate and ice (temperature 0°–5° C). The coupling mixture is at a temperature of 5° C and has a pH of 9.5 and a volume of 1.2 l. It is stirred for 16 hours, 100 g of sodium chloride are then added, the mixture is stirred for a further 2 hours and the dyestuff is filtered off and dried.

The dyestuff dyes polyamide in clear yellow shades.

Similar dyestuffs are obtained if the compounds listed below are used as the 2nd coupling component:

| Example | Coupling component Component H-K | Colour Shade on Polyamide |
|---|---|---|
| 2 | o-cresol | yellow |
| 3 | p-cresol | yellow |
| 4 | acetoacetic acid anilide | greenish-tinged yellow |
| 5 | acetoacetic acid m-xylidide | greenish-tinged yellow |
| 6 | acetoacetic acid o-anisidide | greenish-tinged yellow |
| 7 | acetoacetic acid o-chloroanilide | greenish-tinged yellow |
| 8 | 1-phenyl-3-methyl-5-aminopyrazole +) | greenish-tinged yellow |
| 9 | 1-(m-sulphophenyl)-3-methyl-5-aminopyrazole +) | greenish-tinged yellow |
| 10 | 1-phenyl-3-methyl-5-pyrazolone | reddish-tinged yellow |
| 11 | 1-(o-chlorophenyl)-3-methyl-5-pyrazolone | reddish-tinged yellow |
| 12 | 1-(2,5-dichlorophenyl)-3-methyl-5-pyrazolone | orange |
| 13 | 1-(p-sulphophenyl)-3-methyl-5-pyrazolone | reddish-tinged yellow |
| 14 | o-chlorophenol | yellow |

+) is coupled at pH 4.5 – 5.5.

EXAMPLE 15

11.35 g of 4,4'-diaminobenzanilide are tetrazotised as described in Example 1.

9.05 g of 1-phenyl-3-methyl-5-aminopyrazole are stirred in 120 ml of water and dissolved by adding 15 ml of hydrochloric acid of 19° Be strength. This solution is added, at 15° C, to tetrazotised 4,4'-diaminobenanilide. About 170 ml of 20% strength sodium acetate solution are then added over the course of 2 hours, whereby a pH of 3.5–4.0 is reached. When the one-sided coupling is complete, the pH is brought to 5.5 with about 25 ml of sodium hydroxide solution of 40° Be strength. A weakly acid solution of 13.3 g of 1-(m-sulphophenil)-3-methyl-5-aminopyrazole in 100 ml of water is then added. After stirring for 2 hours, the coupling mixture is brought to pH 5.5 with about 30 ml of 20% strength sodium carbonate solution. The temperature is 15° C. After 16 hours, the mixture is brought to pH 7.5 with about 15 ml of 20% strength sodium carbonate solution, and is filtered.

The dried dyestuff dyes polyamide greenish-tinged yellow.

Further dyestuffs are obtained if the following compounds are used as the 2nd coupling component.

| Example | Coupling component H-K | Colour shade on Polyamide |
|---|---|---|
| 16 | acetoacetic anilide p-sulphonic acid | greenish-tinged yellow |
| 17 | phenol-o-sulphonic acid | yellow |
| 18 | 1-(p-sulphophenyl)-3-methyl-5-pyrazolone | reddish-tinged yellow |

I claim:
1. Dyestuff which in the form of the free acid corresponds to the formula

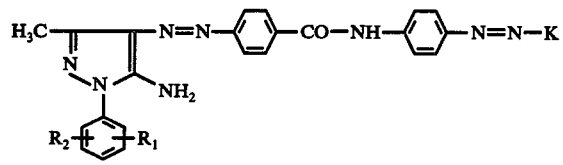

wherein K is

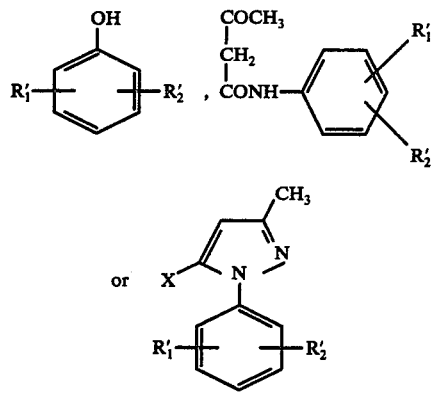

$R_1$, $R_2$, $R_1'$ and $R_2'$ is hydrogen, $C_1$–$C_4$-alkoxy, $C_1$–$C_4$-alkyl, halogen or sulpho, and X is $NH_2$ or OH with the proviso that the dyestuff contains 1 or 2 sulphonic acid groups.

* * * * *